United States Patent
Lewis et al.

(10) Patent No.: US 9,218,529 B2
(45) Date of Patent: *Dec. 22, 2015

(54) 3-D IMAGING SENSOR BASED LOCATION ESTIMATION

(75) Inventors: Christopher L. Lewis, Helotes, TX (US); William C. Flannigan, San Antonio, TX (US); Michael O. Blanton, San Antonio, TX (US); Douglas A. Brooks, San Antonio, TX (US)

(73) Assignee: SOUTHWEST RESEARCH INSTITUTE, San Antonio, TX (US)

(*) Notice: Subject to any disclaimer, the term of this patent is extended or adjusted under 35 U.S.C. 154(b) by 574 days.

This patent is subject to a terminal disclaimer.

(21) Appl. No.: 13/610,507

(22) Filed: Sep. 11, 2012

(65) Prior Publication Data

US 2015/0227775 A1  Aug. 13, 2015

(51) Int. Cl.
*G06F 19/00* (2011.01)
*G06K 9/00* (2006.01)
*G06T 15/00* (2011.01)
*G06T 17/05* (2011.01)

(52) U.S. Cl.
CPC .............. *G06K 9/0063* (2013.01); *G06T 15/00* (2013.01); *G06T 17/05* (2013.01)

(58) Field of Classification Search
CPC .... G01C 21/3602; G01C 21/00; G01C 21/32; G06T 2207/30256; G01S 1/026
USPC .......... 701/50; 342/450, 456.1, 457; 382/104, 382/154; 704/246, 251, 255; 345/180; 377/10
See application file for complete search history.

(56) References Cited

U.S. PATENT DOCUMENTS 7,333,631 B2   2/2008  Roh et al.
7,525,484 B2   4/2009  Dupray et al.

(Continued)

OTHER PUBLICATIONS

Lai et al., Location Estimation and Trajectory Prediction of Moving Lateral Vehicle Using Two Wheel Shapes Information in 2-D Lateral Vehicle Images by 3-D Computer Vision Techniques, 2003, IEEE, p. 881-886.*

(Continued)

*Primary Examiner* — McDieunel Marc
(74) *Attorney, Agent, or Firm* — Grossman, Tucker et al

(57) ABSTRACT

A system and method for estimating a location of an object or vehicle is provided. Images of a region encompassing the object are obtained, providing a three dimensional (3-D) view frame of the region. 3-D view frames are collected along a direction of travel of the object. A 3-D map is generated along the direction of travel of the object, the map based on the 3-D view frames and further based on an estimate of motion of the object at times associated with the 3-D view frames. A first set of features is extracted from the 3-D map. A geo-referenced feature database is searched for a second set of features that match the first set of features. A geo-location associated with the second set of features is retrieved from the feature database. The location of the object is estimated based on the retrieved geo-location.

20 Claims, 5 Drawing Sheets

(56) References Cited

U.S. PATENT DOCUMENTS

| | | |
|---|---|---|
| 7,764,231 B1 | 7/2010 | Karr et al. |
| 7,904,483 B2 | 3/2011 | Koch et al. |
| 7,917,543 B2 | 3/2011 | Koch et al. |
| 7,920,721 B2 | 4/2011 | Unoura |
| 8,351,704 B2 | 1/2013 | Kmiecik et al. |
| 8,442,305 B2 | 5/2013 | Ramalingam |
| 8,725,413 B2 * | 5/2014 | Kozak et al. .................. 701/446 |
| 8,942,917 B2 * | 1/2015 | Chrysanthakopoulos .... 701/410 |
| 8,996,036 B2 | 3/2015 | Whipple et al. |
| 2005/0063563 A1 | 3/2005 | Soliman |
| 2006/0095172 A1 | 5/2006 | Abramovitch et al. |
| 2008/0045236 A1 | 2/2008 | Nahon et al. |
| 2010/0161225 A1 | 6/2010 | Hyung et al. |
| 2010/0208937 A1 | 8/2010 | Kmiecik et al. |
| 2010/0215216 A1 | 8/2010 | Hong et al. |
| 2010/0215218 A1 | 8/2010 | Takahashi |
| 2010/0304850 A1 | 12/2010 | Gelman et al. |
| 2011/0150319 A1 | 6/2011 | Ramalingam |
| 2011/0164832 A1 | 7/2011 | Yoon et al. |
| 2012/0071151 A1 | 3/2012 | Abramson et al. |
| 2012/0095673 A1 * | 4/2012 | Choi et al. .................... 701/300 |
| 2013/0109345 A1 | 5/2013 | Edge et al. |
| 2013/0210405 A1 | 8/2013 | Whipple et al. |
| 2014/0005932 A1 * | 1/2014 | Kozak et al. .................. 701/446 |

OTHER PUBLICATIONS

Aytekin et al., Increasing Driving Safety with a Multiple Vehicle Detection and Tracking System using Ongoing Vehicle Shadow Information, 2010, IEEE, p. 3650-3656.*

Murata et al., Onboard Locating System Using Real-Time Image Processing for a Self-Navigating Vehicle, 1993, IEEE, p. 145-154.*

Kanhere et al., Real-Time Incremental Segmentation and Tracking of Vehicles at Low Camera Angles Using Stable Features, 2008, IEEE, p. 148-160.*

Nefian et al. Planetary Rover Localization Within Orbital Maps, 2014, IEEE, p. 1628-1632.*

Lim et al., Aerosol Optical Thickness Data Retrieval Over Penang Island, Malaysia, 2009, IEEE, p. 1-5.*

U.S. Office Action, mail date Oct. 24, 2014 issued in related U.S. Appl. No. 13/369,954, (10 pgs).

U.S. Office Action, mail date Jun. 16, 2014 issued in related U.S. Appl. No. 13/369,954, (8 pgs).

U.S. Office Action, mail date Oct. 9, 2013, issued in related U.S. Appl. No. 13/537,776, (16 pgs).

* cited by examiner

3-D IMAGING SENSOR BASED LOCATION ESTIMATION

FIELD OF INVENTION

The present disclosure relates to location estimation, and in particular to location estimation through correlation of features in local 3-D images to features in geo-referenced overhead images.

BACKGROUND

Existing location systems, such as those used in moving vehicles, typically employ Global Positioning System (GPS) receivers. These systems generally suffer from a number of limitations such as limited precision and accuracy, a requirement of unobstructed line of sight to multiple satellites in the GPS constellation, and susceptibility to jamming and denial of service. Although some of these limitations may be overcome through the use of additional technology and equipment, these approaches are typically expensive.

Inertial navigation systems may provide an alternative method for self location of a vehicle from a known starting point. These systems use accelerometers but they require calibration and tend to drift over time thus requiring periodic re-calibration which limits their accuracy and suitability for many applications.

What is needed, therefore, are improved methods and systems for autonomous self location of an object, such as a moving vehicle, with increased reliability and precision.

SUMMARY

The present disclosure describes methods and systems for estimating the location of an object, for example a pedestrian or a vehicle, using electro-optic sensors such as stereo cameras, structured lighting sensors or a combination of cameras and time of flight range sensors. The location may be estimated through correlation, or matching, of features in local three dimensional (3-D) maps to features in a geo-referenced database. The local 3-D maps may be generated from a collection of images of the region surrounding the vehicle obtained by imaging sensors disposed on the vehicle. The geo-referenced database may be generated from overhead images, such as aerial or satellite images. The vehicle may include, but not be limited to, an automobile, truck, train or any other ground based vehicle.

In some embodiments, the imaging sensors may observe the region surrounding the vehicle as it travels along. Sequences of imagery form a local 3-D map of the region surrounding the vehicle which may be analyzed to extract identifying features. These features may include, but not be limited to, natural or man-made structures, trees or other types of vegetation, roadways or any other features that may be identified in an image. The location may be estimated by comparing the extracted features from the local 3-D map to the geo-referenced database that includes features extracted from previously obtained overhead images taken within the same general geographic area within which the vehicle may be expected to operate, that is to say, a geographic area of interest. The feature database may further include geo-locations associated with each previously obtained image and feature set. The vehicle location estimation may thus be based on the geo-locations stored in the feature database.

BRIEF DESCRIPTION OF DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION OF PREFERRED EMBODIMENTS

Figure 1:
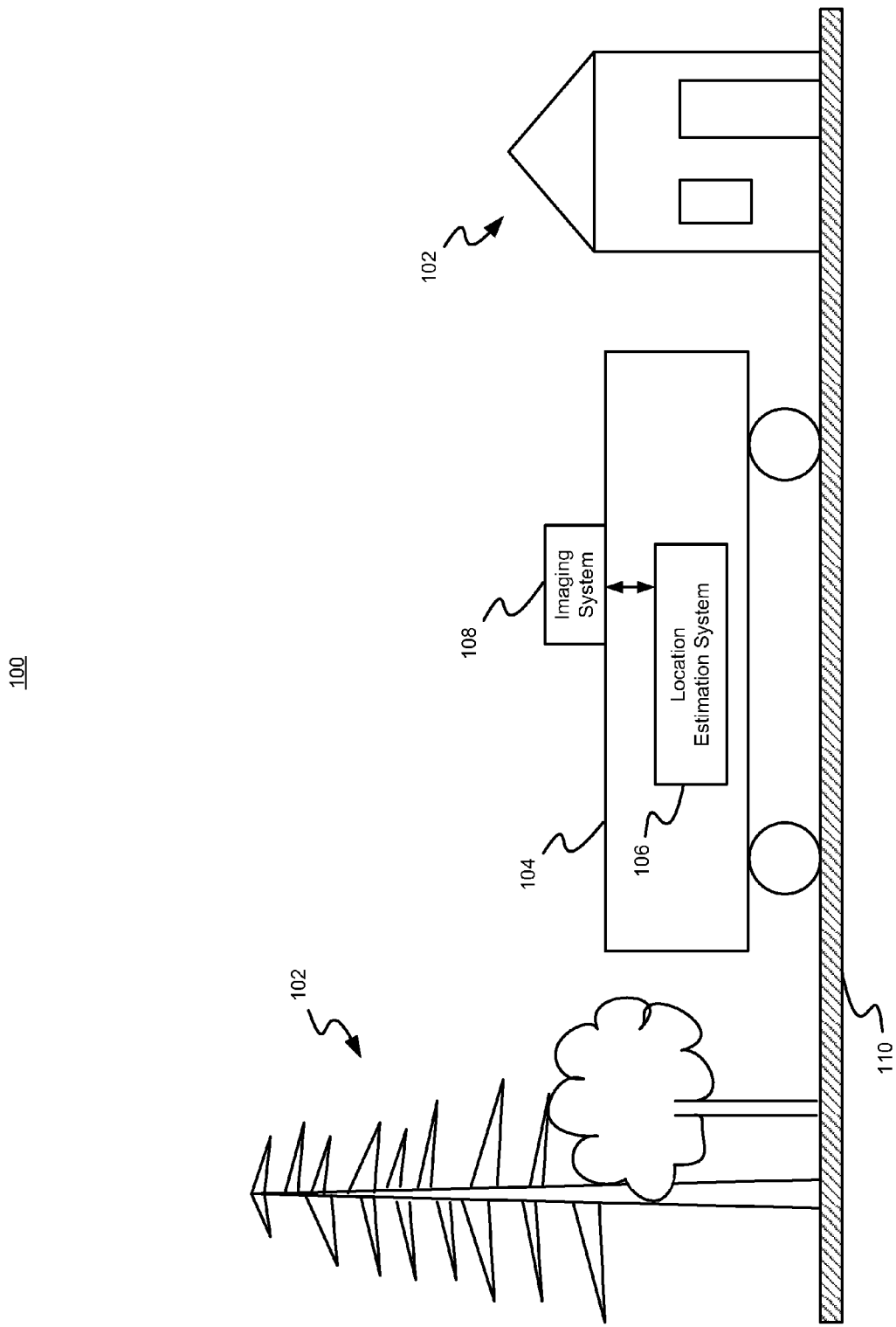
FIG. 1 illustrates a top-level diagram of one exemplary embodiment consistent with the present disclosure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

The present disclosure relates to location estimation of an object associated with the method or device, such as a person, robot or vehicle utilizing the device to identify a given location. The present disclosure is therefore particularly suitable for vehicle location estimation through the correlation, or matching, of features in local three dimensional (3-D) maps to features in a geo-referenced database. The local 3-D maps may be generated from a collection of images of the region surrounding the vehicle and obtained by electro-optic sensors disposed on the vehicle. The term "images" may be understood to refer to 3-D data generated by any number of sensors and may comprise red-green-blue (RGB) and/or other spectral information. The geo-referenced database may be generated from overhead images, such as aerial or satellite images. The vehicle may include, but not be limited to, an automobile, truck, train or any other ground based vehicle.

In some embodiments, the imaging sensors may be any electro-optic sensor suite capable of collecting 3-D data. Electro-optic sensors may include but are not limited to cameras, stereo cameras, structured lighting systems, light detection and ranging (LIDAR) sensors and time of flight laser range sensors. The local 3-D map of the region surrounding the vehicle may be analyzed to extract identifying features. These features may include, but not be limited to, natural or man-made structures, trees or other types of vegetation, roadways or any other features that may be identified in an image. The location may be estimated by comparing the extracted features from the local 3-D map to the geo-referenced database that includes features extracted from previously obtained overhead images taken within the same general geographic area within which the vehicle may be expected to operate, that is to say, a geographic area of interest. The feature database may further include geo-locations associated with each previously obtained image and feature set. The vehicle location estimation may thus be based on the geo-locations stored in the feature database.

Referring now to FIG. 1, there is shown a top-level diagram 100 of a system deployment of one exemplary embodiment consistent with the present disclosure as applied to a vehicle, but it can be appreciated that the device and method herein may be used to identify location of any object associated with this exemplary embodiment. A vehicle 104 may be on a path or road 110. The vehicle 104 may preferably be in motion although in some embodiments it may be stationary. An imaging system 108 may be located on the vehicle 104 in any position or orientation suitable for obtaining images of the surrounding region, such as, for example, on the roof of the vehicle. The images so obtained may then be transmitted to the location estimation system 106, the operation of which will be described in greater detail below.

The vehicle 104 may be any type of vehicle or object, including a pedestrian or robot, and the path 110 may be any type of pathway including, but not limited to, roads (for vehicular traffic), parking lots, fields or trails (primarily for pedestrians and certain off-road vehicles). Any number and variety of identifiable features 102 may exist within the region surrounding the vehicle. As illustrated in FIG. 1, these features may include trees, houses and building, but in general any type of natural or man-made structures, types of vegetation or other objects that may be visible to the imaging system 108 may be included as features for identification and extraction.

In some embodiments, the location estimation system 106 may be located within the vehicle 104, as shown, while in other embodiments it may be located remotely and may communicate with the vehicle through wireless communication mechanisms. In some embodiments, one portion of the location and estimation system 106 may be located within the vehicle 104 while the remainder may be located remotely. It will be appreciated that, for example, one or more instances of the map database, to be described below, may be located remotely and shared between systems in different vehicles.

Figure 2:
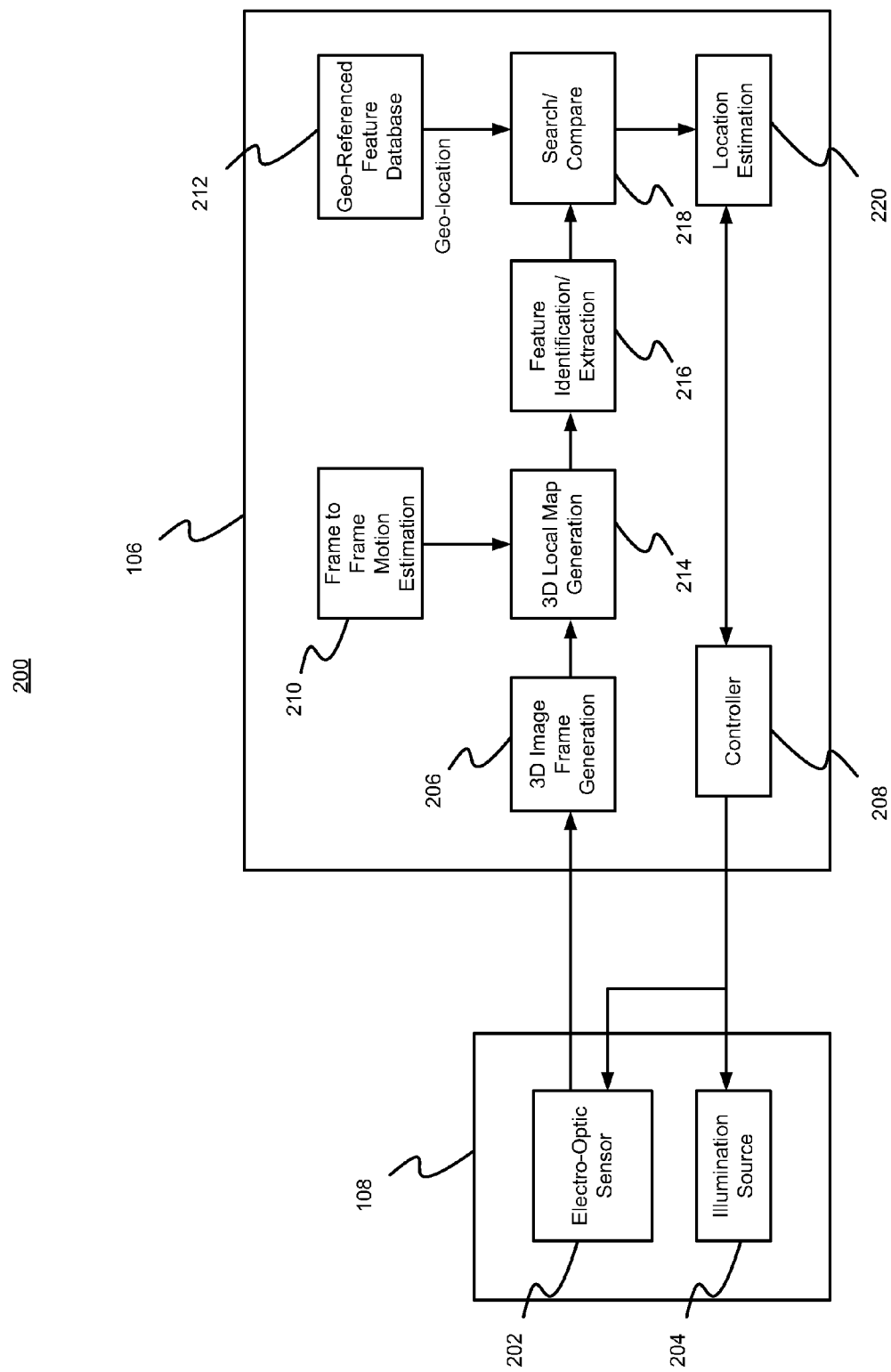
FIG. 2 illustrates a system block diagram of one exemplary embodiment consistent with the present disclosure.

Referring now to FIG. 2, there is shown a more detailed view of imaging system 108 and location estimation system 106 consistent with an exemplary embodiment the present disclosure.

Imaging system 108 is shown to comprise an electro-optic sensor 202 and an illumination source 204. One or more Electro-optic sensors 202, such as a camera, may be deployed. The sensors may typically be mounted on the vehicle 104 at a position and orientation providing a view of the region surrounding the vehicle. In some embodiments the sensors may employ line scanning or area scanning techniques. The sensors may be aligned longitudinally and/or laterally with the vehicle. Two sensors may be employed in a stereoscopic configuration, having a field of view that overlaps at least in part, to generate 3-D images, although any sensor or combination of sensors that produce 3-D data may be used. The sensors may be configured to operate in one or more suitable spectral ranges including, for example, broadband visible, near infrared, ultraviolet, etc.

Illumination source 204 may provide a stable source of illumination, at an intensity and in a spectral range, which is compatible with the sensor 202 such that consistent imaging results may be obtained, independent of other sources of ambient light. In some embodiments, the illumination may be strobed to reduce average power consumption while providing increased peak power output. In this case, the strobe timing is synchronized with the sensor image acquisition. In some embodiments, sensor image acquisition rates may vary depending on the vehicle speed. For example, in the case of a stationary vehicle, one acquisition may be obtained, while in the case of a vehicle travelling at 60 miles per hour, the acquisition rate may be 30 Hz or more.

Location estimation system 106 is shown to comprise a 3-D image frame generation module 206, a 3-D local map generation module 214, a frame to frame motion estimation module 210, feature identification and extraction module 216, a search and compare module 218, a geo-referenced feature database 212, a location estimation module 220, and a controller module 208.

3-D image frame generation module 206 obtains the image acquired by sensor 202 and generates a 3-D image frame covering the field of view of the image sensors. Depth in the 3-D image may be estimated, for example in the case of stereoscopic image sensors, based on the geometry of the stereoscopic image sensor configuration, i.e., the difference in viewing angle that results from the physical separation between the sensors. Wider sensor separation and/or increased sensor resolution may generally improve depth estimation. In some embodiments, sensor separation may be in the range 20 cm to 5 meters and sensor resolution may be in the range 5 cm per pixel to 1 meter per pixel. For sensors suites that comprise a single plane LIDAR sensor, the resolution for that sensor may be even lower. For triangulation sensors such as stereoscopic cameras and structured lighting sensors, objects that are at greater distances from the sensor will be imaged at lower resolution than objects which are closer. In some embodiments, lower resolution data may be discarded and a lower bound resolution threshold may be 10 cm per pixel.

Frame to frame motion estimation module 210 estimates the relative motion (e.g., change in position) of the imaging sensors from one frame to the next. The relative motion may be derived from wheel encoders, inertial measurement sensors (e.g., accelerometers and/or gyroscopes), electro-optic sensors 202 or additional electro-optic sensors (not shown) or any other suitable mechanism. The motion estimate is provided to 3-D local map generation module 214 along with the 3-D image frames generated by module 206 so that a 3-D map of the region surrounding the vehicle may be synthesized based on a number of previous image frames (e.g., behind the vehicle) and a current image frame which may extend out ahead of the vehicle.

In the example embodiment, approximately 100 frames may be fused to create a synthesized map. With each new frame of data, the oldest frame may be discarded. The 6 degrees of freedom (DOF) relative motion between frames is estimated using the inertial measurement system. The data from the latest frame is transformed from the sensor coordinates into the map coordinates using the best estimate of the vehicle's state. The number of frames used may range from 1 to several hundred depending on the desired coverage area for the analysis. It is generally desirable for the resolution from the fused frames to be similar to the resolution of the overhead imagery.

Feature identification and extraction module 216 analyzes the 3-D local map generated by module 214 to extract any identifying features (e.g., a feature set) that may be present in the region surrounding the vehicle. Features may include, but not be limited to, for example, natural or man-made structures, trees or other types of vegetation, roadways or any other features that may be identified in an image. Search/compare module 218 searches a geo-referenced feature database 212 for a stored feature set that matches the currently extracted feature set. The geo-referenced feature database 212 may comprise features extracted from overhead imagery obtained, for example, from aircraft or satellites. In some embodiments, a match may be considered to have been achieved when the estimated transform between the local map and the aerial map is supported by a sufficient number of individual features whose descriptors are paired. The number of supporting features will be greater than 2, but generally 20 to 30 pairs of features are used to determine the occurrence of a match.

Geo-referenced feature database 212 also stores geo-locations that are associated with the stored feature sets. If search/compare module 218 succeeds in matching a currently extracted feature set to a previously stored feature in the database 212, the associated geo-location may be retrieved from the database 212 and used by location estimation module 220 to estimate the vehicle location.

In some embodiments, an approximate location of the vehicle 104 may be known or available, either through other means or from previous estimation attempts. In such case, the approximate location may be advantageously used to limit the database search to a constrained geographic region, with a resultant decrease in search time. This may be possible where the geo-referenced feature database 212 is organized such that feature data can be retrieved efficiently for a specific region.

In some embodiments controller module 208 may be provided to control and coordinate the activities of the other system modules and components. For example, controller 208 may synchronize illumination source 204 with sensor 202 and determine the timing of image acquisition based on location estimation requirements.

Figure 3:
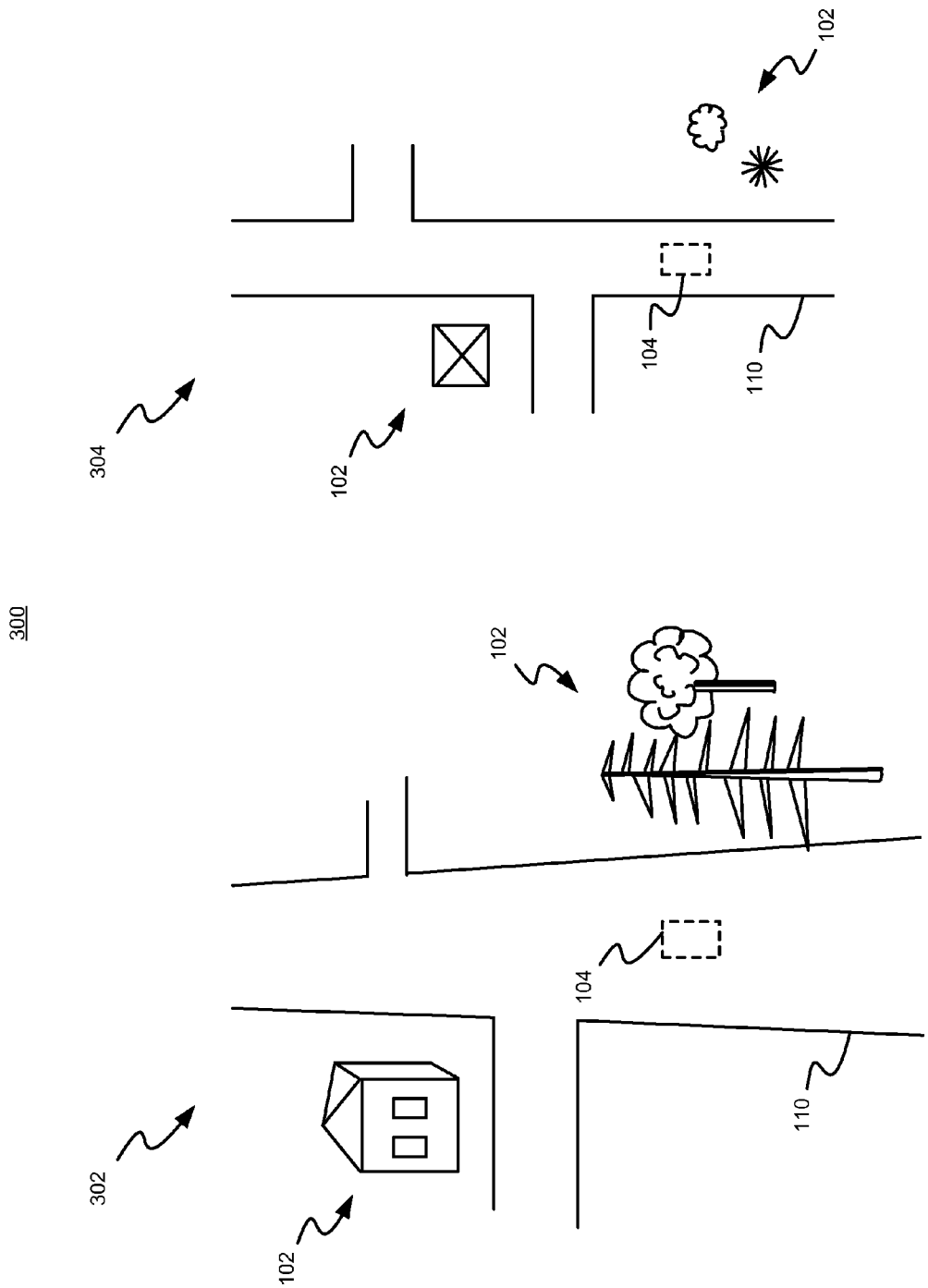
FIG. 3 illustrates the identification of features in a 3-D local map and in an overhead image in accordance with an exemplary embodiment of the present disclosure.

Referring now to FIG. 3, the identification of features in a 3-D local map and in an overhead image, in accordance with an exemplary embodiment of the present disclosure, is illustrated. A 3-D local map 302, corresponding to an example region, is shown. The 3-D local map 302 may be generated from a fusion of successive 3-D image frames obtained by vehicle 104 travelling along road 110 as described above. Various 3-D features 102, such as trees and buildings, are shown. The 3-D local map 302 may be analyzed to identify and extract these features 102. It will be appreciated that the ability to uniquely identify an image area will improve with the number of features extracted. An overhead image 304, corresponding to the same region is also shown. Features 102 are shown as they might appear to an imaging aircraft or satellite. The overhead image 304 may be pre-processed to extract and store features, along with their corresponding geo-locations, in a database configured for efficient searching.

Figure 4:
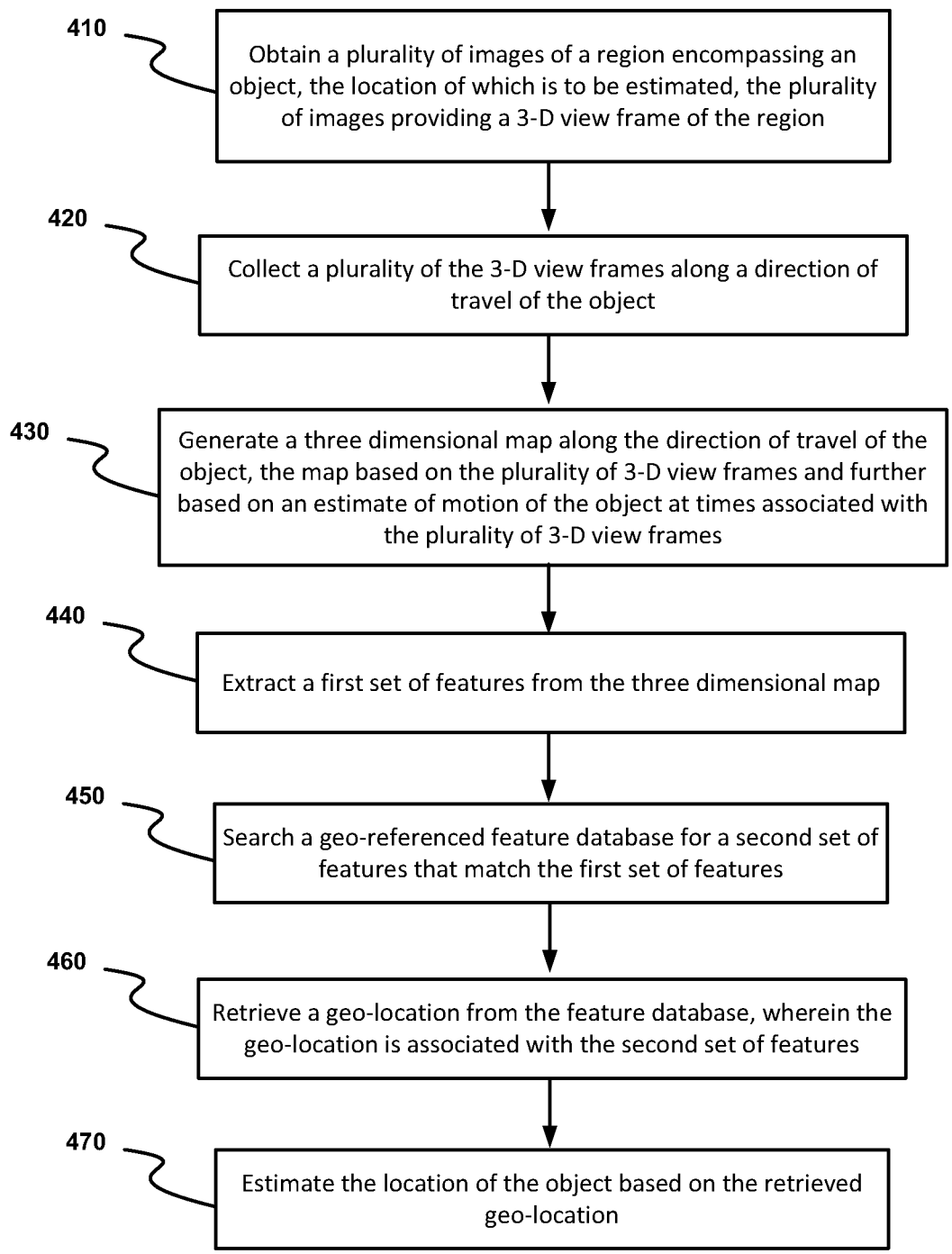
FIG. 4 illustrates a flowchart of operations of another exemplary embodiment consistent with the present disclosure.

Referring now to FIG. 4, there is supplied a flowchart 400 of one of the preferred methods consistent with an exemplary embodiment of a location estimator according to the present disclosure. At operation 410, a plurality of images of a region encompassing an object, the location of which is to be estimated, are obtained. The plurality of images provide a 3-D view frame of the region. At operation 420, a plurality of the 3-D view frames along a direction of travel of the object are collected. At operation 430, a three dimensional map along the direction of travel of the object, is generated. The map is based on the plurality of 3-D view frames and further based on an estimate of motion of the object at times associated with the plurality of 3-D view frames. At operation 440, a first set of features is extracted from the three dimensional map. At operation 450, a geo-referenced feature database is searched for a second set of features that match the first set of features.

At operation 460, a geo-location associated with the second set of features is retrieved from the feature database. At operation 470, the location of the object is estimated based on the retrieved geo-location.

In view of the foregoing, it may be appreciated that the present disclosure also relates to an article comprising a non-transitory storage medium having stored thereon instructions that when executed by a machine result in the performance of the steps of the methods as described in the examples above such as, for example, in connection with the description associated with FIG. 4.

Figure 5:
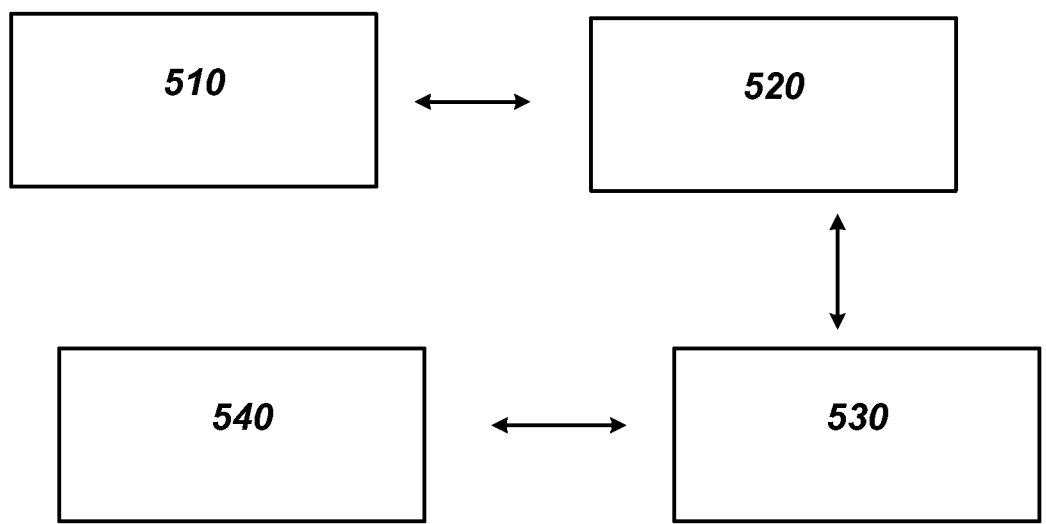
FIG. 5 illustrates a processor, machine readable media, imaging input and user interface that may be employed in an exemplary embodiment consistent with the present disclosure.

It should also be appreciated that the functionality described herein for the embodiments of the present invention may therefore be implemented by using hardware, software, or a combination of hardware and software, as desired. If implemented by software, a processor and a machine readable medium are required. The processor may be any type of processor capable of providing the speed and functionality required by the embodiments of the invention. Machine-readable memory includes any non-transitory media capable of storing instructions adapted to be executed by a processor. Non-transitory media include all computer-readable media with the exception of a transitory, propagating signal. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on a medium in either a compressed and/or encrypted format. Accordingly, in the broad context of the present invention, and with attention to FIG. 5, the system and method for the herein disclosed vehicle location estimation may be accomplished with a processor (510) and machine readable media (520) and user interface (530) plus imaging input (540).

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method for estimating a location of an object comprising:
    obtaining a plurality of images of a region encompassing said object, said plurality of images providing a three dimensional (3-D) view frame of said region;
    collecting a plurality of said view frames along a direction of travel of said object;
    generating a three dimensional (3-D) map along said direction of travel of said object, said map based on said plurality of view frames and further based on an estimate of motion of said object at times associated with said plurality of view frames;
    extracting a first set of features from said 3-D map;
    searching a geo-referenced feature database for a second set of features that match said first set of features;
    retrieving a geo-location from said feature database, wherein said geo-location is associated with said second set of features; and
    estimating said location of said object based on said retrieved geo-location.

2. The method of claim 1, wherein said searching is restricted to a subset of said feature database, said subset comprising geo-locations within a geographic area of interest.

3. The method of claim 2, wherein said geographic area of interest is based on a previous location estimate.

4. The method of claim 1, further comprising generating said motion estimate from inertial sensors disposed on said object.

5. The method of claim 1, wherein said image is obtained from an electro-optic sensor.

6. The method of claim 1, further comprising providing an illumination source.

7. The method of claim 1, wherein said feature database is generated from an aerial image of said region.

8. The method of claim 1, wherein said feature database is generated from a satellite image of said region.

9. A system for estimating a location of an object comprising:
   an imaging sensor configured to obtain a plurality of images of a region encompassing said object, said plurality of images providing a 3-D view of said region;
   a 3-D image frame generation module configured to generate a 3-D image frame based on said 3-D view;
   a motion estimation module configured to estimate motion of said object at times associated with said obtaining of said images;
   a 3-D map generation module configured to collect a plurality of said generated 3-D image frames and further configured to generate a 3-D map along a direction of travel of said object, said map based on said plurality of 3-D image frames and further based on said motion estimate;
   a processing module configured to extract a first set of features from said 3-D map; and
   a feature database configured to store a plurality of sets of features and associated geo-locations, wherein said processing module is further configured to search said feature database for a second set of features that match said first set of features and retrieve a geo-location associated with said second set of features such that said location of said object is estimated based on said retrieved geo-location.

10. The system of claim 9, wherein said imaging sensor is an electro-optic sensor.

11. The system of claim 9, further comprising an illumination source configured to strobe in synchronization with said sensor imaging.

12. The system of claim 9, wherein said searching is restricted to a subset of said feature database, said subset comprising geo-locations within a geographic area of interest.

13. The system of claim 12, wherein said geographic area of interest is based on a previous location estimate.

14. The system of claim 9, wherein said motion estimation module comprises an inertial sensor configured to estimate motion of said object.

15. The system of claim 9, wherein said feature database is generated from an aerial image of said region.

16. The system of claim 9, wherein said feature database is generated from a satellite image of said region.

17. An article comprising a non-transitory storage medium having stored thereon instructions that when executed by a machine result in the following operations:
    obtaining a plurality of images of a region encompassing said object, said plurality of images providing a 3-D view frame of said region;
    collecting a plurality of said view frames along a direction of travel of said object;
    generating a 3-D map along said direction of travel of said object, said map based on said plurality of view frames and further based on an estimate of motion of said object at times associated with said plurality of view frames;
    extracting a first set of features from said 3-D map;
    searching a geo-referenced feature database for a second set of features that match said first set of features;
    retrieving a geo-location from said feature database, wherein said geo-location is associated with said second set of features; and
    estimating said location of said object based on said retrieved geo-location.

18. The article of claim 17, wherein said searching is restricted to a subset of said feature database, said subset comprising geo-locations within a geographic area of interest.

19. The article of claim 18, wherein said geographic area of interest is based on a previous location estimate.

20. The article of claim 17, further comprising generating said motion estimate from inertial sensors disposed on said object.

* * * * *